(12) United States Patent
Sakota et al.

(10) Patent No.: US 11,177,489 B2
(45) Date of Patent: Nov. 16, 2021

(54) CENTRIFUGAL COMPRESSOR WITH DIFFUSER

(71) Applicant: IHI Corporation, Tokyo (JP)

(72) Inventors: Koji Sakota, Tokyo (JP); Nobuyuki Ikeya, Tokyo (JP); Kaoru Kaneko, Tokyo (JP); Naomi Sawachika, Tokyo (JP)

( * ) Notice: Subject to any disclaimer, the term of this patent is extended or adjusted under 35 U.S.C. 154(b) by 15 days.

(21) Appl. No.: 16/862,568

(22) Filed: Apr. 30, 2020

(65) Prior Publication Data

US 2020/0259193 A1 Aug. 13, 2020

Related U.S. Application Data

(63) Continuation of application No. PCT/JP2018/039913, filed on Oct. 26, 2018.

(30) Foreign Application Priority Data

Nov. 1, 2017 (JP) .............................. JP2017-211846

(51) Int. Cl.
*F04D 25/08* (2006.01)
*H01M 8/04111* (2016.01)
(Continued)

(52) U.S. Cl.
CPC ......... *H01M 8/04111* (2013.01); *F04D 17/10* (2013.01); *F04D 25/082* (2013.01); *F04D 29/057* (2013.01); *F04D 29/441* (2013.01); *F04D 29/584* (2013.01); *F04D 29/5826* (2013.01); *F05B 2220/40* (2013.01);
(Continued)

(58) Field of Classification Search
None
See application file for complete search history.

(56) References Cited

U.S. PATENT DOCUMENTS 5,165,849 A * 11/1992 Nakagawa ............ F04D 29/462
415/148
6,102,672 A 8/2000 Woollenweber et al.
(Continued)

FOREIGN PATENT DOCUMENTS

CN 103174678 6/2013
CN 104653478 5/2015
(Continued)

OTHER PUBLICATIONS

International Preliminary Report on Patentability with Written Opinion dated May 14, 2020 for PCT/JP2018/039913.
(Continued)

*Primary Examiner* — Michael Lebentritt
(74) *Attorney, Agent, or Firm* — Soei Patent & Law Firm

(57) ABSTRACT

A centrifugal compressor includes a rotation shaft, a compressor impeller attached to one end of the rotation shaft, and a first wall surface and a second wall surface formed inside a housing so as to face each other in an axial direction. A diffuser is formed between the first wall surface and the second wall surface in the axial direction, and a wall portion separates the diffuser from an axial space inside the housing in which the rotation shaft extends. The wall portion includes at least one extraction hole that fluidly couples the diffuser to the axial spate and that is configured to extract a gas from the diffuser.

20 Claims, 6 Drawing Sheets

(51) Int. Cl.
*F04D 17/10* (2006.01)
*F04D 29/057* (2006.01)
*F04D 29/44* (2006.01)
*F04D 29/58* (2006.01)

(52) U.S. Cl.
CPC ....... *F05B 2240/12* (2013.01); *F05B 2240/53* (2013.01); *F05B 2260/20* (2013.01)

(56) References Cited

U.S. PATENT DOCUMENTS

| | | | |
|---|---|---|---|
| 2006/0115358 A1* | 6/2006 | Umeyama | F04D 29/30 415/206 |
| 2008/0141679 A1 | 6/2008 | Behaghel et al. | |
| 2009/0056681 A1 | 3/2009 | Shibui et al. | |
| 2011/0097222 A1 | 4/2011 | Komatsu et al. | |
| 2012/0014788 A1* | 1/2012 | Blair | F04D 25/163 415/208.2 |
| 2013/0034425 A1* | 2/2013 | Biscay | F04D 29/444 415/1 |
| 2014/0144412 A1 | 5/2014 | An et al. | |
| 2014/0377053 A1* | 12/2014 | Tamaki | F04D 29/685 415/58.4 |
| 2016/0102677 A1 | 4/2016 | An et al. | |
| 2016/0348684 A1* | 12/2016 | Kuhns | F04D 17/122 |
| 2017/0191502 A1* | 7/2017 | Ozaki | F04D 29/4213 |
| 2017/0211595 A1 | 7/2017 | Bertoneri et al. | |
| 2017/0284518 A1* | 10/2017 | Fukuyama | F16H 13/06 |
| 2018/0135647 A1* | 5/2018 | Okada | F04D 29/444 |
| 2019/0101133 A1* | 4/2019 | Okada | F04D 29/284 |
| 2020/0263559 A1* | 8/2020 | Blaylock | F01D 25/24 |

FOREIGN PATENT DOCUMENTS

| | | |
|---|---|---|
| CN | 106104006 | 11/2016 |
| CN | 106460863 | 2/2017 |
| EP | 3128184 | 2/2017 |
| JP | S63-277821 | 11/1988 |
| JP | H3-015696 | 1/1991 |
| JP | H4-099418 | 8/1992 |
| JP | H5-033667 | 2/1993 |
| JP | 2001-200791 | 7/2001 |
| JP | 2007-040255 | 2/2007 |
| JP | 2008-025577 | 2/2008 |
| JP | 2009-097519 | 5/2009 |
| JP | 2010-151034 | 7/2010 |
| JP | 2010-196478 | 9/2010 |
| JP | 2011-089459 | 5/2011 |
| JP | 2011-202588 | 10/2011 |
| JP | 2011-202589 | 10/2011 |
| JP | 2012-062778 | 3/2012 |
| JP | 2012-246931 | 12/2012 |
| JP | 2013-024041 | 2/2013 |
| JP | 2014-058935 | 4/2014 |

OTHER PUBLICATIONS

International Search Report dated Jan. 22, 2019 for PCT/JP2018/039913.
International Search Report dated Jan. 22, 2019 for PCT/JP2018/039371.
International Search Report dated Jan. 22, 2019 for PCT/JP2018/039363.

* cited by examiner

CENTRIFUGAL COMPRESSOR WITH DIFFUSER

CROSS-REFERENCE TO RELATED APPLICATIONS

This application is a continuation application of PCT Application No. PCT/JP2018/039913, filed Oct. 26, 2018, which claims the benefit of priority from Japanese Patent Application No. 2017-211846, filed Nov. 1, 2017, the entire contents of which are incorporated herein by reference.

BACKGROUND

Japanese Unexamined Utility Model Publication No. H4-99418, Japanese Unexamined Patent Publication No. 2010-151034 and Japanese Unexamined Patent Publication No. 2008-25577 describe techniques relating to a centrifugal compressor.

Japanese Unexamined Utility Model Publication No. H4-99418 discloses a configuration in which part of a gas compressed by a centrifugal compressor is supplied to a gas bearing in the centrifugal compressor having the gas bearing. Japanese Unexamined Patent Publication No. 2010-151034 discloses a configuration in which a circulation flow path is formed so as to return part of a fluid flowing in a diffuser of a centrifugal compressor from a downstream region of the diffuser to an upstream region thereof, and the fluid flowing in the circulation flow path is cooled by a cooling means. Japanese Unexamined Patent Publication No. 2008-25577 discloses a configuration in which part of an air flow for ventilating a turbine is guided to a downstream side surface of an impeller of a centrifugal compressor so that the downstream side surface of the impeller is cooled.

SUMMARY

An opening or hole located somewhere in a housing for taking out (extracting) a gas may be provided in order to use part of the gas that is compressed by a centrifugal compressor. However, foreign matter such as impurities may be mixed in the gas that is drawn into or sucked by the centrifugal compressor. The impurities may have an adverse effect on one or more parts of the centrifugal compressor. The centrifugal compressors disclosed herein may be configured to reduce the possibility of foreign matter mixed in a part of an extracted compressed gas.

An example centrifugal compressor includes a rotation shaft which is provided inside a housing and has a rotation axis and a compressor impeller which is accommodated inside the housing and is attached to a first end of the rotation shaft. Additionally, the centrifugal compressor may include a first wall surface and a second wall surface which are formed inside the housing, respectively extend in a radial direction and a circumferential direction of the rotation axis, and face each other in a direction of the rotation axis.

The centrifugal compressor may also include a diffuser which is formed between the first wall surface and the second wall surface in a periphery of the compressor impeller and extends in the radial direction and the circumferential direction, and a scroll which is connected to the diffuser and positions the first wall surface between the diffuser and the scroll. Still further, the centrifugal compressor may include a wall portion which includes the second wall surface and separates the diffuser from a space inside the housing in which the rotation shaft extends. The wall portion is provided with at least one extraction hole which extracts a gas from the diffuser and connects the diffuser to the space, and the wall portion is not provided with a through-hole which returns the extracted gas to the diffuser.

DETAILED DESCRIPTION

Figure 1:
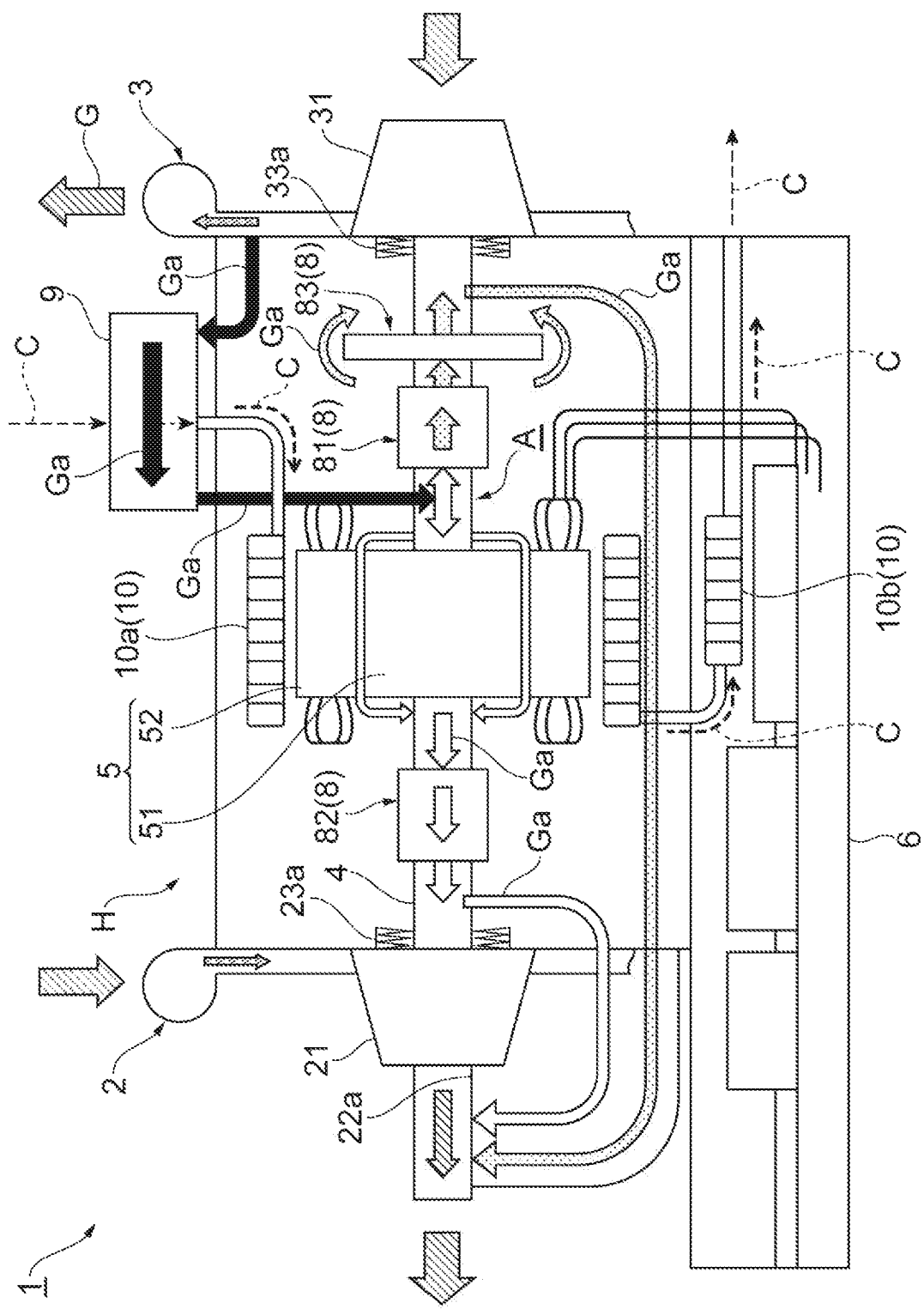
FIG. 1 is schematic diagram illustrating an example centrifugal compressor.

An example centrifugal compressor disclosed herein includes a rotation shaft which is provided inside a housing and has a rotation axis and a compressor impeller which is accommodated inside the housing and is attached to a first end of the rotation shaft. A first wall surface and a second wall surface which are formed inside the housing, respectively extend in a radial direction and a circumferential direction of the rotation axis, and face each other in a direction of the rotation axis. The centrifugal compressor further includes a diffuser which is formed between the first wall surface and the second wall surface in a periphery of the compressor impeller and extends in the radial direction and the circumferential direction, and a scroll which is connected to the diffuser and positions the first wall surface between the diffuser and the scroll. A wall portion which includes the second wall surface, separates the diffuser from a space inside the housing in which the rotation shaft extends. Additionally, the wall portion is provided with at least one extraction hole which extracts a gas from the diffuser and connects the diffuser to the space. In some examples, the wall portion is not provided with a through-hole which returns the extracted gas to the diffuser.

Gas may be compressed by the rotation of the compressor impeller, and the compressed gas flows from the diffuser to the scroll. At least one extraction hole formed in the wall portion connects the diffuser to the space inside the housing. A part of the compressed gas flowing through the diffuser is extracted through the extraction hole and can be used for one or more functions. In the diffuser, a flow velocity of the compressed gas (a flow velocity toward the outside in the radial direction) is relatively large. Thus, even when foreign matter is mixed in a gas that is drawn into or sucked by the centrifugal compressor, the foreign matter tends to be carried in the scroll with the flow velocity of the compressed gas. Thus, the centrifugal compressor can reduce the possibility of foreign matter mixed in a part of the compressed gas extracted through the extraction hole.

In some embodiments, the centrifugal compressor further includes a gas bearing structure which supports the rotation shaft, a bearing cooling line which forms part of the space inside the housing and connects the extraction hole to the gas bearing structure, and a cooler which is connected to the bearing cooling line and is configured to cool the gas extracted through the extraction hole. The cooled gas is supplied to the gas bearing structure through the bearing cooling line. Thus, the gas bearing structure with the centrifugal compressor can be cooled by extracting the compressed gas in a configuration which can be called a self cooling mechanism of the centrifugal compressor. This configuration with the extraction hole suppressing the mixture of foreign matter is particularly useful for a gas bearing structure that is susceptible to the effects of foreign matter.

In some embodiments, a plurality of vanes which protrude toward the first wall surface and are arranged in the diffuser at intervals in the circumferential direction are fixed to the wall portion. The extraction hole is an elongated hole formed between two adjacent vanes, and the elongated hole extends so as to be elongated in a flow direction of a flow formed between the two vanes. The elongated hole extending in the flow direction further reduces a possibility that foreign matter is mixed in the extracted gas while maintaining an extraction opening area.

In some embodiments, each of the plurality of vanes includes a trailing edge and the extraction hole is provided at a position overlapping a pitch circle diameter (PCD) of the trailing edge. The extraction hole provided at a position overlapping the PCD of the trailing edge allows the extraction of the gas while achieving the recovery of the static pressure in the diffuser. Thus, the extracted gas has a high utility value from the viewpoint of pressure.

In some embodiments, the wall portion is provided with only one extraction hole to extract the required amount of gas, which may facilitate the formation of the extraction hole in the wall portion.

In the following description, with reference to the drawings, the same reference numbers are assigned to the same components or to similar components having the same function, and overlapping description is omitted.

An example centrifugal compressor will be described with reference to the electric turbocharger 1 illustrated in FIG. 1. The electric turbocharger 1 may be applied to, for example, a fuel cell system. The fuel cell system may be, for example, a polymer electrolyte fuel cell (PEFC), a phosphoric acid fuel cell (PAFC), or other type of fuel cell system.

Figure 2:
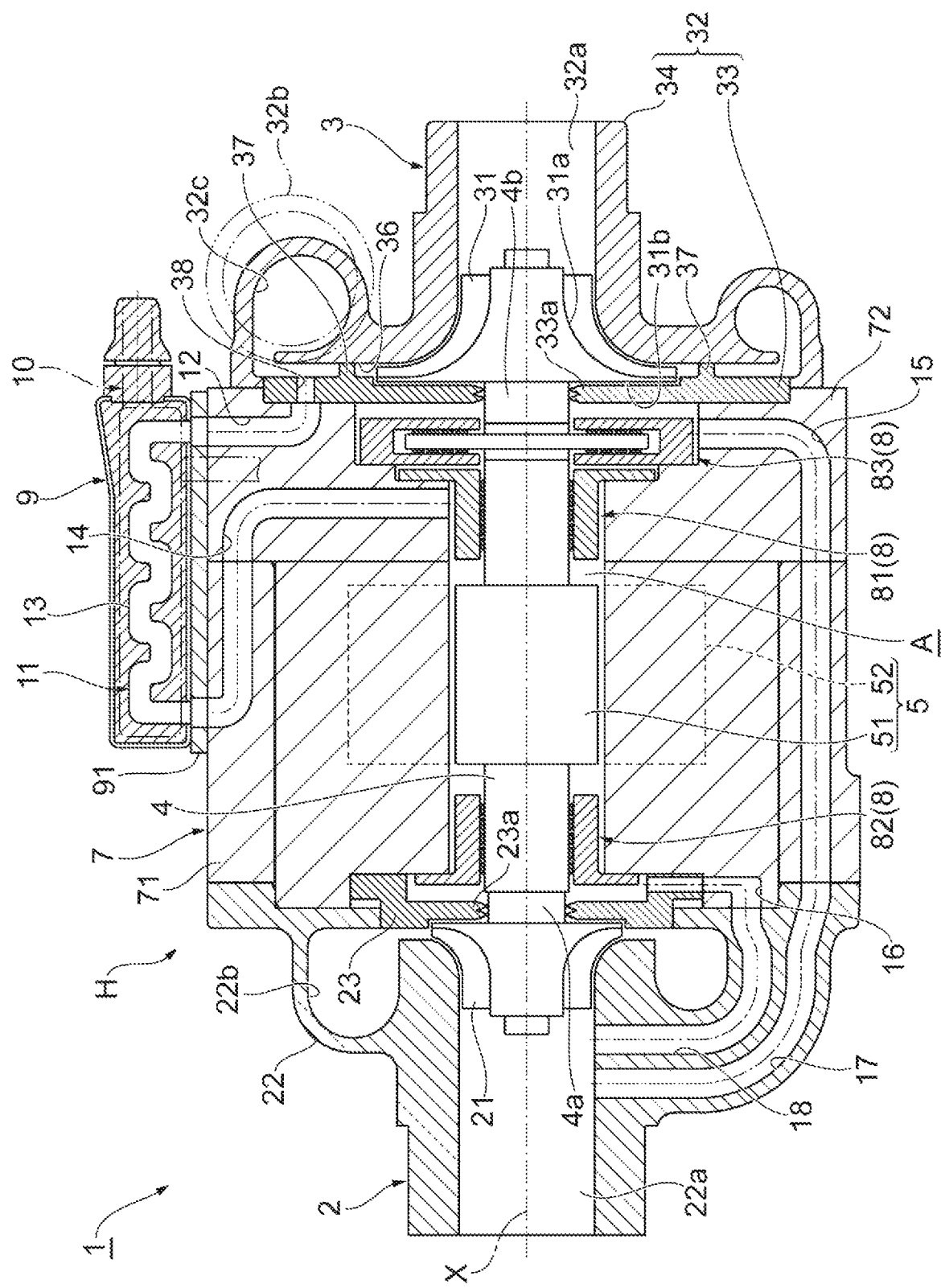
FIG. 2 is a cross-sectional view illustrating an example centrifugal compressor.

As illustrated in FIGS. 1 and 2, the electric turbocharger 1 includes a turbine 2, a compressor 3, and a rotation shaft 4 having the turbine 2 and the compressor 3 provided at opposite ends thereof. A motor 5 for applying a rotational driving force to the rotation shaft 4 is provided between the turbine 2 and the compressor 3. Compressed air (an example of "compressed gas") G compressed by the compressor 3 is supplied to the fuel cell system as an oxidant (oxygen). In the fuel cell system, power is generated by a chemical reaction between fuel and oxidant. Air containing water vapor is discharged from the fuel cell system and this air is supplied to the turbine 2.

The electric turbocharger 1 rotates a turbine impeller 21 of the turbine 2 by using high-temperature air discharged from the fuel cell system. As the turbine impeller 21 rotates, a compressor impeller 31 of the compressor 3 rotates and the compressed air G is supplied to the fuel cell system. Additionally, in the electric turbocharger 1, most of a driving force of the compressor 3 may be provided by the motor 5. That is, the electric turbocharger 1 may be a substantially motor-driven turbocharger.

The fuel cell system and the electric turbocharger 1 may be installed in, for example, a vehicle (an electric vehicle). Additionally, the motor 5 of the electric turbocharger 1 may be supplied with electricity generated by the fuel cell system or may be supplied with electricity from a source other than the fuel cell system.

The electric turbocharger 1 includes the turbine 2, the compressor 3, the rotation shaft 4 having the rotation axis X, the motor 5, and an inverter 6 which controls the rotational driving of the motor 5. The electric turbocharger 1 includes the rotation shaft 4, the motor 5, an air bearing structure 8, and a housing H accommodating an impeller or the like, which will be described in additional detail later.

The turbine 2 includes a turbine housing 22 and a turbine impeller 21 accommodated in the turbine housing 22. The compressor 3 includes a compressor housing 32 and a compressor impeller 31 accommodated in the compressor housing 32. The rotation shaft 4 has a first end 4a and a second end 4b. The turbine impeller 21 is attached to the second end 4b of the rotation shaft 4 and the compressor impeller 31 is attached to the first end 4a of the rotation shaft 4.

A motor housing 7 is provided between the turbine housing 22 and the compressor housing 32. The rotation shaft 4 is rotatably supported by the motor housing 7 through the air bearing structure (an example of the "gas bearing structure") 8. In some examples, the housing H of the electric turbocharger 1 includes the turbine housing 22, the compressor housing 32, and the motor housing 7.

The turbine housing 22 is provided with an exhaust gas inlet and an exhaust gas outlet 22a. Air containing water vapor discharged from the fuel cell system flows into the turbine housing 22 through the exhaust gas inlet. The inflowing air passes through a turbine scroll 22b and is supplied to the inlet side of the turbine impeller 21. The turbine impeller 21 is, for example, a radial turbine that generates a rotation force by using a pressure of supplied air. Then, air flows to the outside of the turbine housing 22 through the exhaust gas outlet 22a.

The compressor housing 32 is provided with a suction port 32a and a discharge port 32b. When the turbine impeller 21 rotates as described above, the rotation shaft 4 and the compressor impeller 31 rotate. The rotating compressor impeller 31 sucks or draws in external air through the suction port 32a and compresses the air. The compressed air G compressed by the compressor impeller 31 passes through a compressor scroll 32c and is discharged from the discharge port 32b. The compressed air G discharged from the discharge port 32b is supplied to the fuel cell system. The compressor impeller 31 has a front surface 31a facing the suction port 32a and a back surface 31b located on the opposite side of the compressor impeller 31 from the front surface 31a.

The motor 5 is, for example, a brushless AC motor and includes a rotor 51 serving as a rotating member and a stator 52 serving as a fixed member. The rotor 51 includes one or more magnets. The rotor 51 is fixed to the rotation shaft 4 and is rotatable around an axis together with the rotation shaft 4. The rotor 51 is disposed in the center portion of the rotation shaft 4 in the axial direction. The stator 52 includes a plurality of coils and a core. The stator 52 is disposed so as to surround the rotor 51 in the circumferential direction of the rotation shaft 4. The stator 52 generates a magnetic field around the rotation shaft 4 and rotates the rotor 51 in cooperation with the rotor 51.

An example cooling structure that cools heat generated in a machine includes a heat exchanger (cooler) 9 which is attached to the motor housing 7 and a coolant line 10, and an air cooling line 11 which pass through the heat exchanger 9. The coolant line 10 and the air cooling line 11 are connected or fluidly coupled to each other in the heat exchanger 9 so as to exchange heat therebetween. A part of the compressed air G compressed by the compressor 3 passes through the air cooling line 11. In some examples, a part of the compressed air G is extracted and flows as the extracted air Ga in the air cooling line 11. A coolant C whose temperature is lower than the extracted air Ga passing through the air cooling line 11 passes through the coolant line 10.

The coolant line 10 is a part of the circulation line connected or fluidly coupled to a radiator provided outside the electric turbocharger 1. The temperature of the coolant C passing through the coolant line 10 is between approximately 50° C. and 100° C. The coolant line 10 includes a motor cooling unit 10a disposed along the stator 52 and an inverter cooling unit 10b disposed along the inverter 6. The coolant C having passed through the heat exchanger 9 flows while circling around the stator 52 in the motor cooling unit 10a and cools the stator 52. Then, the coolant C flows while meandering along a control circuit of the inverter 6 in the inverter cooling unit 10b, and cools the inverter 6. In some examples, the control circuit of the inverter 6 may comprise an insulated gate bipolar transistor (IGBT), a bipolar transistor, a MOSFET, a gate turn-off thyristor (GTO), or the like.

The air cooling line 11 is configured to transfer the extracted air Ga which is a part of the compressed air G compressed by the compressor 3. In the electric turbocharger 1, a pressure on the side of the compressor 3 is set to be higher than a pressure on the side of the turbine 2. The structure of the air cooling line 11 cools the air bearing structure 8 by efficiently using this pressure difference. In some examples, the air cooling line 11 extracts a part of the compressed air G compressed by the compressor 3, guides the extracted air Ga to the air bearing structure 8, and sends the extracted air Ga having passed through the air bearing structure 8 to the turbine 2. Additionally, the temperature of the compressed air G that is between approximately 150° C. and 250° C. is decreased to about 70 to 80° C. by the heat exchanger 9. On the other hand, since the temperature of the air bearing structure 8 is 150° C. or more, the air bearing structure can be appropriately cooled by supplying the extracted air Ga thereto.

The motor housing 7 includes a stator housing 71 which accommodates the stator 52 surrounding the rotor 51 and a bearing housing 72 which is provided with the air bearing structure 8. The stator housing 71 and the bearing housing 72 are provided with an axial space (a part of a space inside the housing H) A through which the rotation shaft 4 penetrates. Both end portions of the axial space A are provided with labyrinth structures 33a and 23a maintaining the inside of the axial space A in a hermetic state.

The compressor housing 32 is fixed to the bearing housing 72. The compressor housing 32 includes an impeller chamber 34 which accommodates the compressor impeller 31 and a diffuser plate 33 which forms the diffuser 36 in cooperation with the impeller chamber 34. The impeller chamber 34 includes the suction port 32a which draws in air, the discharge port 32b which sends the compressed air G compressed by the compressor impeller 31, and the compressor scroll 32c which is connected or fluidly coupled to the downstream side of the diffuser 36 in the flow direction of the compressed air G. The compressor housing 32 has an opening 32g which exposes the back surface 31b of the compressor impeller 31. The diffuser plate 33 closes the opening 32g and faces to the back surface 31b of the compressor impeller 31.

The labyrinth structure 33a is provided in the center portion (the periphery of the rotation shaft 4) of the diffuser plate 33. On the other hand, a seal plate 23 is disposed between the stator housing 71 and the turbine housing 22. The labyrinth structure 23a is provided in the center portion (the periphery of the rotation shaft 4) of the seal plate 23.

An extraction hole 38 which extracts a part of the compressed air G is formed in the diffuser plate 33. The extraction hole 38 is an inlet of the air cooling line 11. The extraction hole 38 is connected or fluidly coupled to, for example, a first communication flow path (a part of a space inside the housing H) 12 that is provided in the bearing housing 72. The first communication flow path 12 is connected or fluidly coupled to the heat exchanger 9. The first communication flow path 12 has, for example, a circular cross-sectional shape.

The heat exchanger 9 is attached to an outer peripheral surface of the motor housing 7 through a pedestal 91. The heat exchanger 9 is provided with an air flow path (an example of a "gas flow path") 13 through which the extracted air Ga passes. The air flow path 13 is a part of the air cooling line 11 and can exchange heat with the coolant line 10. The heat exchanger 9 is configured to cool the extracted air Ga extracted through the extraction hole 38. The heat exchanger 9 is installed at a position straddling the stator housing 71 and the bearing housing 72.

The air flow path 13 is connected or fluidly coupled to a second communication flow path (a part of a space inside the housing H) 14. The second communication flow path 14 is provided in the motor housing 7. The second communication flow path 14 penetrates the stator housing 71 and the bearing housing 72 and is connected or fluidly coupled to the air bearing structure 8 disposed in the axial space A. The first communication flow path 12, the second communication flow path 14, and the axial space A are a part of the bearing cooling line connected or fluidly coupled to the heat exchanger 9.

The air bearing structure 8 which supports the rotation shaft 4 includes a pair of radial bearings 81 and 82 and a thrust bearing 83.

The pair of radial bearings 81 and 82 regulates the movement of the rotation shaft 4 in a direction orthogonal to the rotation shaft 4 while allowing the rotation thereof. The pair of radial bearings 81 and 82 are, for example, dynamic pressure type air bearings and are arranged so as to sandwich the rotor 51 provided at the center portion of the rotation shaft 4.

The pair of radial bearings 81 and 82 includes a first radial bearing 81 disposed between the rotor 51 and the compressor impeller 31 and a second radial bearing 82 disposed between the rotor 51 and the turbine impeller 21. The first radial bearing 81 and the second radial bearing 82 have substantially the same structure and the first radial bearing 81 will be described representatively.

The first radial bearing 81 has a structure in which ambient air is drawn between the rotation shaft 4 and the first radial bearing 81 with the rotation of the rotation shaft 4 (wedge effect) and a pressure is increased to obtain load capacity. The first radial bearing 81 rotatably supports the rotation shaft 4 by the load capacity obtained by the wedge effect. The first radial bearing 81 may comprise, for example, a foil bearing, a tilting pad bearing, a spiral groove bearing, or the like.

The thrust bearing 83 regulates the movement of the rotation shaft 4 in the axial direction of the rotation shaft 4 while allowing the rotation thereof. The thrust bearing 83 is a dynamic pressure type air bearing and is disposed between the first radial bearing 81 and the compressor impeller 31.

The thrust bearing 83 has a structure in which ambient air is drawn between the rotation shaft 4 and the thrust bearing 83 with the rotation of the rotation shaft 4 (wedge effect) and a pressure is increased to obtain load capacity. The thrust bearing 83 rotatably supports the rotation shaft 4 by the load capacity obtained by the wedge effect. The thrust bearing 83 may comprise, for example, a foil bearing, a tilting pad bearing, a spiral groove bearing, or the like.

In some examples, a gap is formed between the rotation shaft 4 and the radial bearing 81, inside the thrust bearing 83, between the rotor 51 and the stator 52, and between the rotation shaft 4 and the radial bearing 82. These gaps are a part of the air cooling line 11. When the extracted air Ga passes through these gaps, each bearing of the air bearing structure 8 is cooled. Additionally, the extracted air Ga may be supplied to the air bearing structure 8 not only as cooling air but also as an air source.

As illustrated in FIG. 2, the extracted air Ga having cooled the radial bearing 81 and the thrust bearing 83 is introduced into the exhaust gas outlet 22a through a third communication flow path 15 formed in the motor housing 7 and a fifth communication flow path 17 formed in the turbine housing 22. The extracted air Ga, after having cooled the motor 5 and the radial bearing 82, is introduced into the exhaust gas outlet 22a through a fourth communication flow path 16 formed in the motor housing 7 and a sixth communication flow path 18 formed in the turbine housing 22.

In some examples, the bearing cooling line connects the extraction hole 38 to the air bearing structure 8. Next, an example extraction hole structure formed in the diffuser plate 33 and the diffuser 36 will be described in additional detail with reference to FIGS. 3 to 5.

Figure 3:
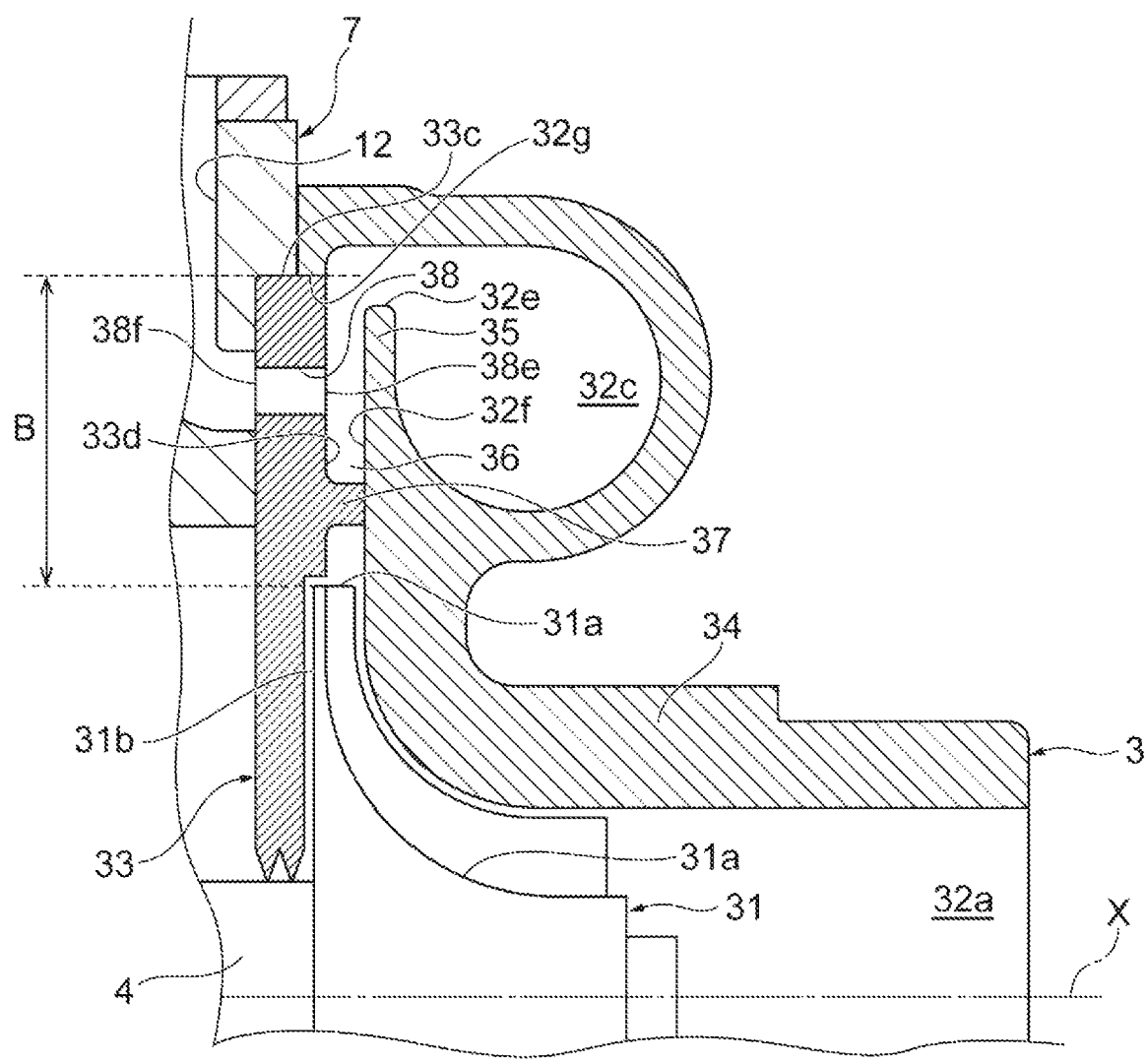
FIG. 3 is a cross-sectional view illustrating a diffuser and a wall portion of the centrifugal compressor of FIG. 2.

As illustrated in FIG. 3, the diffuser 36 is a flow path formed at the side of the diffuser plate 33 of the compressor scroll 32c so as to be located between a surface 33d of the diffuser plate 33 and a surface 32f of an annular overhang wall portion 35 extending in the radial direction. The annular surface 32f and the annular surface 33d face each other in the direction of the rotation axis X. The surface 32f and the surface 33d respectively extend in the radial direction and the circumferential direction and are substantially orthogonal to the rotation axis X. Accordingly, the surface 32f and the surface 33d are, for example, parallel to each other. The surface 32f and the surface 33d are respectively the first wall surface and the second wall surface formed inside the housing H. Additionally, in the specification, the "radial direction" and the "circumferential direction" are based on the rotation axis X.

The diffuser 36 is formed in the periphery (that is, the downstream side) of the compressor impeller 31 and extends in the radial direction and the circumferential direction. In some examples, the trailing edge 31a of the compressor impeller 31 may be, for example, a start end (entrance) of the diffuser 36, and an outer edge 33c of the diffuser plate 33 may be, for example, an end point (exit) of the diffuser 36. A region B illustrated in FIG. 3 may correspond to the diffuser 36. Additionally, the start end of the diffuser 36 may be an inner peripheral edge of the parallel flow path. Further, the end point of the diffuser 36 may be a front end 32e of the overhang wall portion 35.

In two wall surfaces forming the diffuser 36, the surface 32f of the compressor housing 32 is located in the vicinity of the compressor scroll 32c and the surface 33d of the diffuser plate 33 is located at a position separated from the compressor scroll 32c in relation to the surface 32f. Accordingly, the surface 32f may be located between the diffuser 36 and the compressor scroll 32c. On the other hand, the surface 33d of the diffuser plate 33 is located between the diffuser 36 and the axial space A (the inside of the motor housing 7). The diffuser plate 33 is a wall portion that separates the diffuser 36 from a space inside the motor housing 7 in which the rotation shaft 4 extends.

Figure 4:
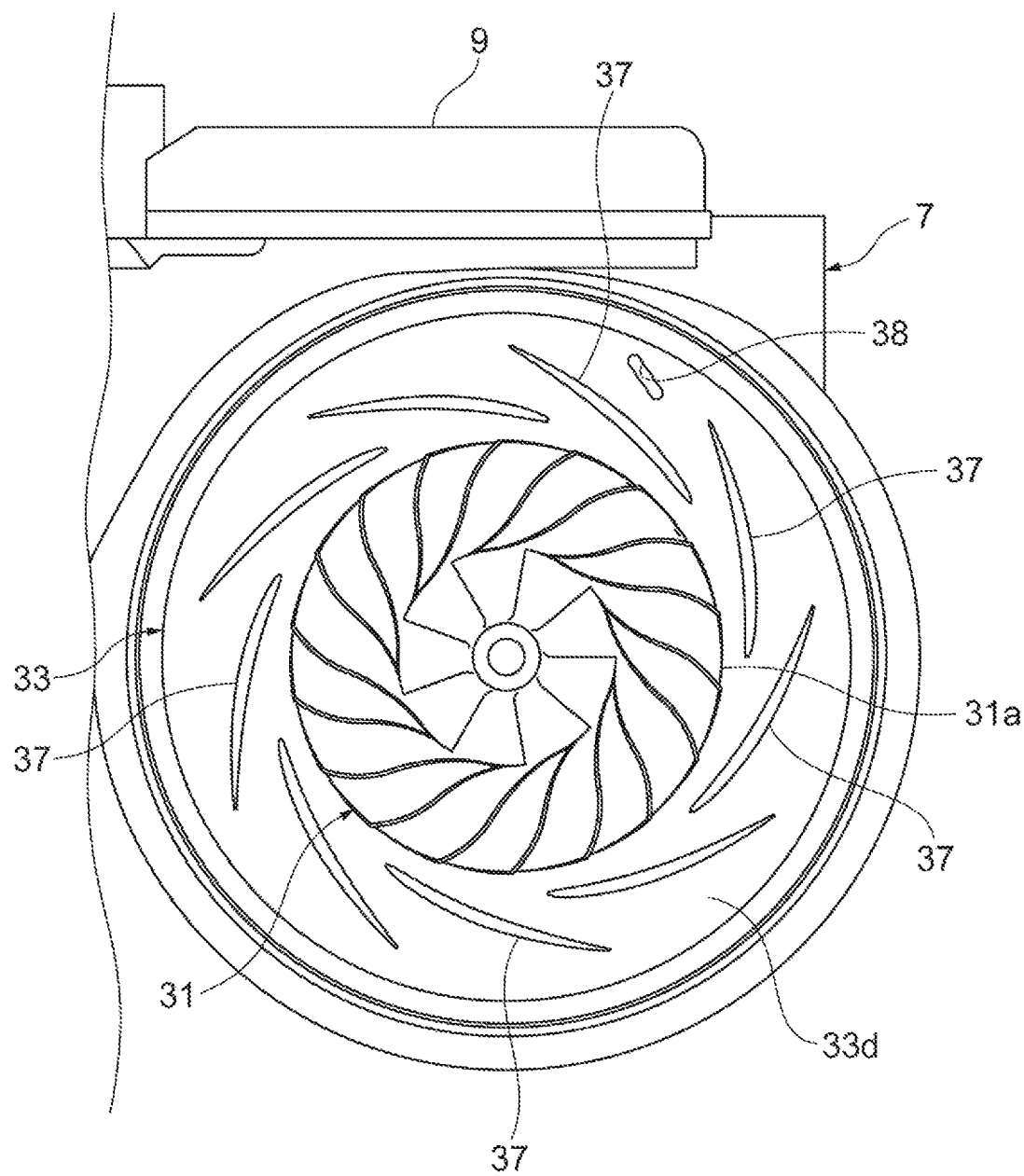
FIG. 4 illustrates an example compressor impeller and a wall portion including a vane as viewed from a rotation axis direction.

As illustrated in FIGS. 3 and 4, only one extraction hole 38 for extracting the compressed air in the diffuser 36 is formed in the diffuser plate 33. The extraction hole 38 is formed in, for example, the range of the above-described region B. The extraction hole 38 connects the diffuser 36 to the first communication flow path 12. As illustrated in FIG. 3, a front surface opening 38e on the side of the diffuser 36 in the extraction hole 38 and a rear surface opening 38f on the side of the first communication flow path 12 in the extraction hole 38 may have the same size and shape. A cross-sectional shape of the extraction hole 38 orthogonal to the rotation axis X may be uniform in the direction of the rotation axis X. The extraction hole 38 may have a pillar shape along the rotation axis X. The front surface opening 38e may be tapered (the edge may be chamfered) so that the front surface opening 38e of the extraction hole 38 opens widely toward the diffuser 36.

The extraction hole 38 may be provided, for example, at the outside of the radial direction. The extraction hole 38 is provided so as to be located in the vicinity of the heat exchanger 9 in the circumferential direction (see FIG. 4). Accordingly, the extraction hole 38 may be provided between the compressor impeller 31 and the heat exchanger 9.

In some examples, one extraction hole 38 is formed in the diffuser plate 33, but no through-hole is formed other than the extraction hole 38. By forming a single through-hole in the diffuser plate 33 without including any through-hole for returning the extracted air Ga to the diffuser 36, the directional flow of air Ga through the diffuser plate 33 may be controlled and a circulation flow path may be avoided.

A plurality of vanes 37 which protrude toward the surface 32f of the compressor housing 32 are fixed to the diffuser plate 33. The plurality of vanes 37 are arranged at the same intervals in the circumferential direction inside the diffuser 36 (see FIG. 4). A flow of the compressed air G is formed between two adjacent vanes 37 and 37.

Figure 5:
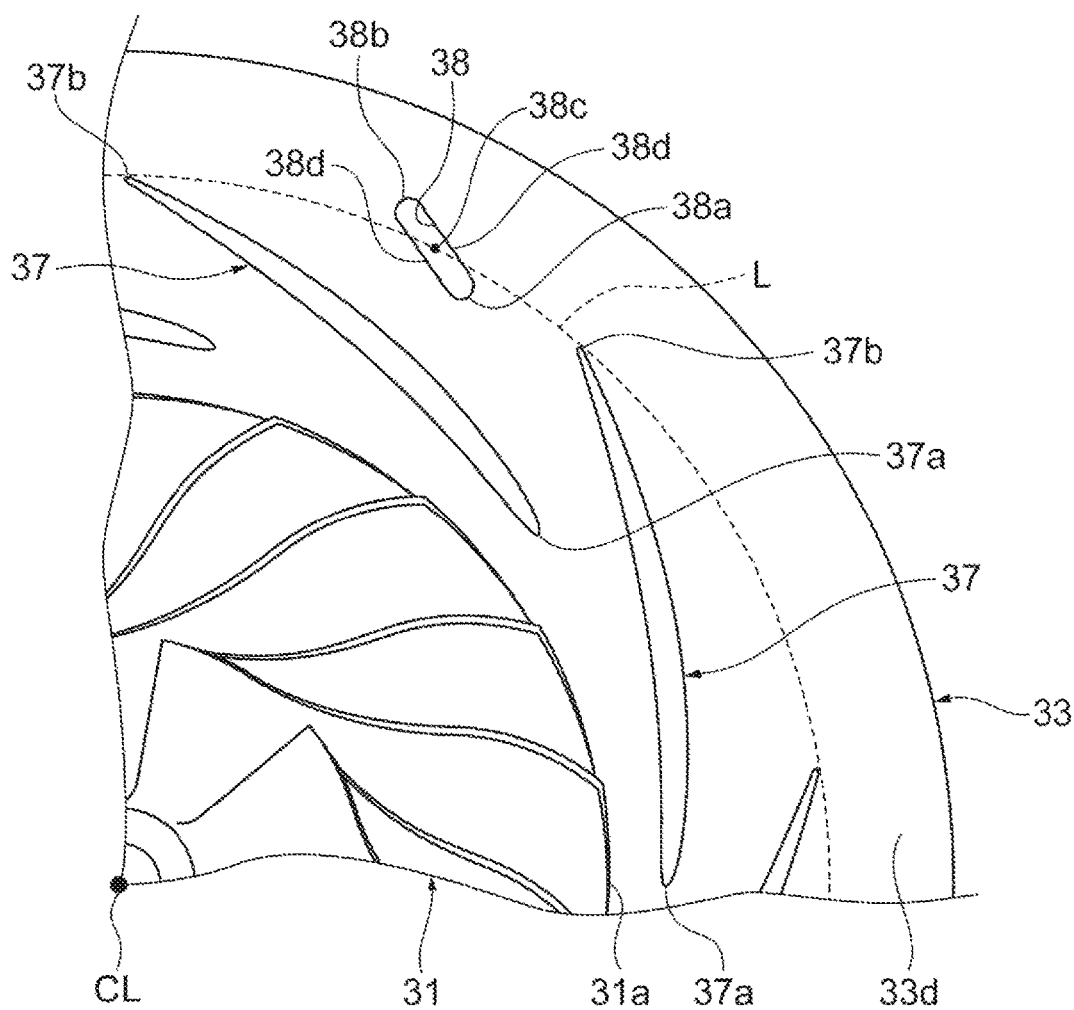
FIG. 5 illustrates an example arrangement of extraction holes of the compressor impeller of FIG. 4.
Figure 6:
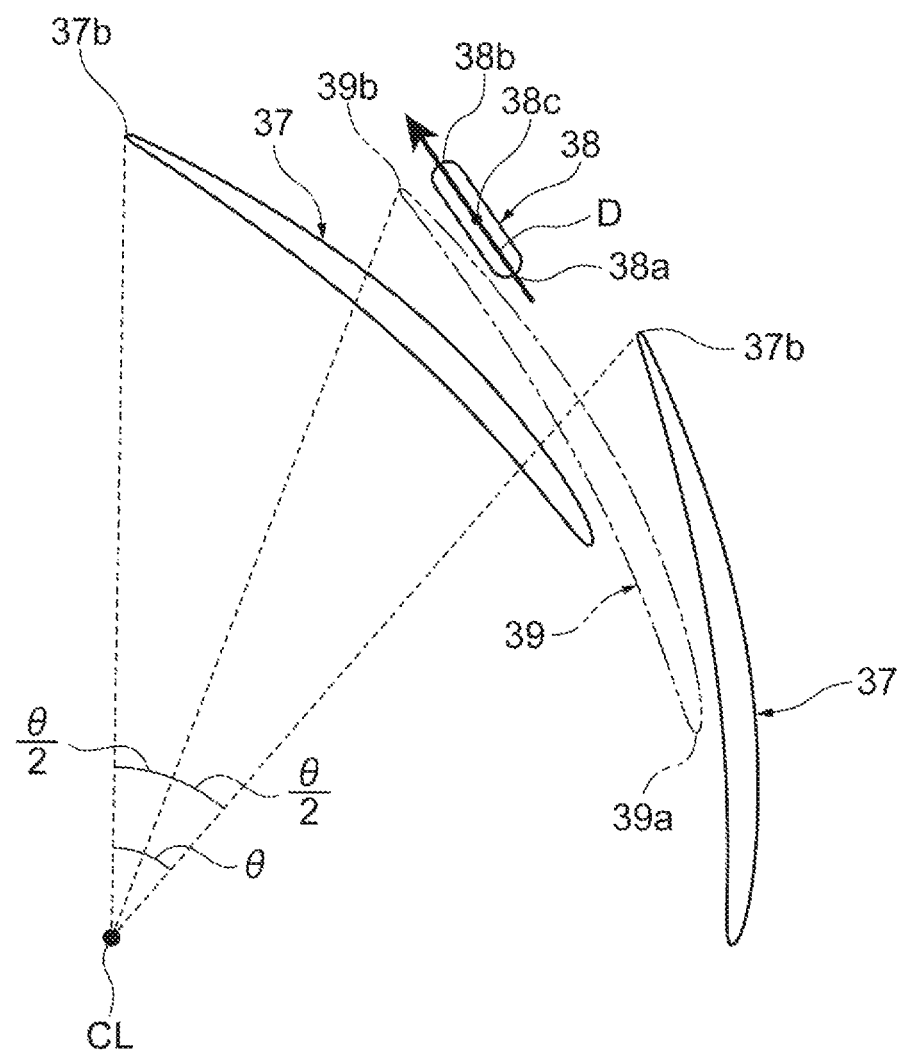
FIG. 6 is a diagram illustrating an elongated hole shape of the extraction holes of FIG. 4.

As illustrated in FIGS. 5 and 6, the extraction hole 38 is an elongated hole which is formed between two adjacent vanes 37 and 37. The extraction hole 38 extends so as to be elongated in the flow direction D of the flow formed between two vanes 37 and 37. The extraction hole 38 includes an inner end 38a which is located closer to a center CL of the diffuser plate 33 in the radial direction, an outer end 38b which is located further from the center CL of the diffuser plate 33 in the radial direction, and a pair of parallel side edges 38d and 38d which connect them. The inner end 38a exists at the center of a first circular-arc shaped edge that connects the side edges 38d and 38d, and the outer end 38b exists at the center of a second circular-arc shaped edge that connects the side edges 38d and 38d. A distance, or length, between the inner end 38a and the outer end 38b is longer than a distance, or width, between the pair of side edges 38d and 38d.

The center 38c of the extraction hole 38 is located on the PCD line L of the trailing edge 37b of the vane 37. Additionally, the center 38c of the extraction hole 38 may be slightly displaced from the PCD line L of the trailing edge 37b of the vane 37. In some examples, the extraction hole 38 is provided at a position overlapping the PCD line L of the trailing edge 37b.

The "flow direction D" can be defined, for example, as follows. As illustrated in FIG. 6, a virtual vane 39 can be assumed between two adjacent vanes 37 and 37. For example, an intermediate line segment having the same length as two line segments can be assumed by equally dividing an angle θ formed by two line segments having the same length and connected from the center CL to the trailing edge 37b of each vane 37. The virtual vane 39 having the same positional relationship as each vane 37 for each line segment can be drawn by placing a trailing edge 39b of the virtual vane 39 at the front end of the intermediate line segment extending from the center CL. A direction parallel to a line connecting the leading edge 39a to the trailing edge 39b of the virtual vane 39 may be defined as the flow direction D. As illustrated in FIG. 6, an arrow extending in the flow direction D passes through the inner end 38a, the center 38c, and the outer end 38b of the extraction hole 38. Additionally, the flow direction D can be defined by performing the same operation based on the leading edge 37a of the vane 37.

In some examples, air is compressed in the electric turbocharger 1 by the rotation of the compressor impeller 31 and the compressed air G flows from the diffuser 36 to the compressor scroll 32c. The extraction hole 38 formed in the diffuser plate 33 connects the diffuser 36 to a space inside the housing H. A part of the compressed air G flowing in the diffuser 36 is extracted through the extraction hole 38 and can be used for one or more purposes. In some examples, the ratio of the flow rate between the compressed air G and the extracted air Ga is, for example, between approximately 99:1 to 90:10. In the diffuser 36, a flow velocity of the compressed air (a flow velocity toward the outside in the radial direction) is relatively large. Thus, even when foreign matter is mixed in the air that is drawn into or sucked by the electric turbocharger 1, the foreign matter tends to be carried into the compressor scroll 32c with the flow velocity of the compressed air. In some examples, only foreign matter contained in the compressed air G having a ratio lower than the above-described ratio (e.g., 10% to 1%) flows into the extracted air Ga. Thus, the electric turbocharger 1 reduces a possibility that foreign matter is mixed in a part of the compressed air extracted through the extraction hole 38.

In the electric turbocharger 1, the internal pressure of the motor housing 7 is increased by the extracted air Ga. Accordingly, leakage of air through the rear part of the compressor impeller 31 (a part provided with the labyrinth structure 33a) may be prevented.

For embodiments in which the electric turbocharger 1 includes the heat exchanger 9, the extracted air Ga may be cooled by the heat exchanger 9. The cooled air is supplied to the air bearing structure 8 through the bearing cooling line. Thus, the air bearing structure 8 of the electric turbocharger 1 can be cooled by extracting the compressed air in the configuration which can be called a self cooling structure of the electric turbocharger 1. For the air bearing structure 8 that is susceptible to the effects of foreign matter, the extraction hole 38 may be effectively used to suppress the mixture of foreign matter.

The extraction holes 38 which are formed as elongated holes extending so as to be elongated in the flow direction D may further reduce a possibility of foreign matter mixed in the extracted air while maintaining the extraction opening area.

The extraction hole 38 provided at a position overlapping the PCD line L of the trailing edge 37b allows the extraction of the gas while achieving the recovery of the static pressure in the diffuser 36. Thus, the extracted air Ga has a high utility value from the viewpoint of pressure.

It is to be understood that not all aspects, advantages and features described herein may necessarily be achieved by, or included in, any one particular example. Indeed, having described and illustrated various examples herein, it should be apparent that other examples may be modified in arrangement and detail.

For example, a single extraction hole 38 provided in the diffuser plate 33 to extract the required amount of air may facilitate the process of fabricating the diffuser plate 33 with the one extraction hole 38. However, in other examples the diffuser plate 33 may be provided with two or more extraction holes 38, in which all or a part of one or more of the extraction holes 38 may be arranged at a position deviating from the PCD line L.

The shape of the extraction hole 38 may include an elongated hole shape, however in other examples the extraction hole 38 may have another type of non-circular shape in which the direction of the extraction hole 38 can be appropriately changed, such as pillar-shaped, rectangular-shaped, arcuate-shaped, or elliptical-shaped, by way of example. Additionally, such as when the diffuser plate 33 is not provided with the vane 37, the longitudinal direction of the extraction hole 38 may be appropriately determined. In other examples, a circular shaped extraction hole may be provided.

In order to cool the extracted air Ga, a type of cooler other than the heat exchanger 9 may be provided, in which case the heat exchanger 9 may be omitted in some examples. Still further, the extracted air Ga may be supplied to a position other than the air bearing structure 8. Other uses of the extracted air Ga include, for example, cooling a motor structure including a rotor and a stator.

The extraction hole structure may be applied to an electric turbocharger without a turbine. In some examples, the extraction hole structure may be applied to a turbocharger without a motor. Still further, the gas compressed by the centrifugal compressor may be a gas other than air.

We claim all modifications and variations coming within the spirit and scope of the subject matter claimed herein.

We claim:

1. A centrifugal compressor comprising:
   a rotation shaft provided inside a housing having a rotation axis;
   a compressor impeller accommodated inside the housing and attached to one end of the rotation shaft;
   a first wall surface and a second wall surface formed inside the housing, the first wall surface and the second wall surface facing each other in an axial direction of the rotation axis;
   a diffuser formed between the first wall surface and the second wall surface in the axial direction; and
   a wall portion including the second wall surface and separating the diffuser from an axial space inside the housing in which the rotation shaft extends,
   wherein the wall portion includes at least one extraction hole that fluidly couples the diffuser to the axial space and that is configured to extract a gas from the diffuser.

2. The centrifugal compressor according to claim 1, further comprising:
   a gas bearing structure supporting the rotation shaft;

a bearing cooling line formed inside the housing as a part of the axial space, the bearing cooling line fluidly coupling the extraction hole to the gas bearing structure; and a cooler that is fluidly coupled to the bearing cooling line and that is configured to cool the gas extracted through the extraction hole.

3. The centrifugal compressor according to claim 1,
wherein a plurality of vanes are fixed to the wall portion, the plurality of vanes protruding toward the first wall surface and being arranged in the diffuser at spaced apart intervals in a circumferential direction of the rotation axis, and
wherein the extraction hole is formed between two adjacent vanes.

4. The centrifugal compressor according to claim 3,
wherein each of the plurality of vanes includes a trailing edge, and
wherein the at least one extraction hole is provided at a position overlapping a pitch circle diameter (PCD) of the trailing edge.

5. The centrifugal compressor according to claim 3,
wherein the at least one extraction hole comprises an elongated hole that is elongated in a flow direction between the two adjacent vanes.

6. The centrifugal compressor according to claim 1,
wherein the wall portion only has a single through-hole, the single through-hole consisting of the at least one extraction hole.

7. The centrifugal compressor according to claim 1,
wherein the housing includes a bearing housing and a compressor housing fixed to the bearing housing, and
wherein the wall portion comprises a diffuser plate that at least partially forms the diffuser, the diffuser plate being disposed between the bearing housing and the compressor hosing.

8. The centrifugal compressor according to claim 7,
wherein the at least one extraction hole comprises a through-hole penetrating the diffuser plate.

9. The centrifugal compressor according to claim 1,
wherein the at least one extraction hole comprises an elongated hole that is elongated in a direction inclined with respect to a radial direction of the rotation axis.

10. The centrifugal compressor according to claim 1,
wherein the wall portion does not include a through-hole configured to return the extracted gas to the diffuser.

11. A centrifugal compressor comprising:
a rotation shaft having a rotation axis;
a compressor impeller attached to the rotation shaft, the compressor impeller including a front surface and a back surface;
a compressor housing accommodating the compressor, the compressor housing including an opening which exposes the back surface of the compressor impeller; and
a diffuser plate that at least partially covers the opening of the compressor housing and faces the back surface of the compressor impeller in an axial direction of the rotation axis, the diffuser plate at least partially forming a diffuser that extends in both a radial direction and a circumferential direction of the rotation axis, the diffuser being disposed radially outward from the compressor impeller,
wherein the diffuser plate includes at least one extraction hole configured to extract a gas from the diffuser.

12. The centrifugal compressor according to claim 11,
wherein a plurality of vanes are attached to the diffuser plate, the plurality of vanes being arranged in the diffuser at spaced apart intervals in the circumferential direction, and
wherein the extraction hole is formed between two adjacent vanes.

13. The centrifugal compressor according to claim 12,
wherein each of the plurality of vanes includes a trailing edge, and
wherein the at least one extraction hole is provided at a position overlapping a pitch circle diameter (PCD) of the trailing edge, the PCD taken with respect to a radial distance of the trailing edge from a center of the diffuser plate, the PCD equal to twice the radial distance.

14. The centrifugal compressor according to claim 11,
wherein the at least one extraction hole comprises an elongated hole that is elongated in a direction inclined with respect to the radial direction of the rotation axis.

15. The centrifugal compressor according to claim 14,
wherein the elongated hole is additionally elongated in a direction that is inclined with respect to the circumferential direction of the rotation axis.

16. The centrifugal compressor according to claim 11,
wherein the diffuser plate has only a single through-hole, the single through-hole consisting of the at least one extraction hole.

17. The centrifugal compressor according to claim 11,
wherein the at least one extraction hole comprises a pillar-shaped through-hole formed in the diffuser plate.

18. The centrifugal compressor according to claim 11, further comprising:
an impeller chamber, the impeller chamber at least partially forming a compressor scroll that is fluidly coupled to the diffuser.

19. The centrifugal compressor according to claim 18,
wherein the impeller chamber includes a first wall surface that is located between the diffuser and the compressor scroll.

20. The centrifugal compressor according to claim 19,
wherein the diffuser plate includes a second wall surface that faces the first wall surface, and
wherein the diffuser is located between the first wall surface and the second wall surface in the axial direction of the rotation axis.

* * * * *